R. F. MEDICUS.
DIRECTION INDICATOR AND SIGNALING DEVICE FOR VEHICLES.
APPLICATION FILED MAY 10, 1916.

1,226,102.

Patented May 15, 1917.
2 SHEETS—SHEET 1.

Inventor
Randall F. Medicus.

Witnesses
W. H. Rowlands
H. P. McCoy

By
C. D. Harpman
his Attorney

R. F. MEDICUS.
DIRECTION INDICATOR AND SIGNALING DEVICE FOR VEHICLES.
APPLICATION FILED MAY 10, 1916.

1,226,102.

Patented May 15, 1917.
2 SHEETS—SHEET 2.

Witnesses
W. H. Rowlands
H. P. McCoy

Inventor
Randall F. Medicus.
By C. S. Narpman
his Attorney

UNITED STATES PATENT OFFICE.

RANDALL F. MEDICUS, OF YOUNGSTOWN, OHIO.

DIRECTION-INDICATOR AND SIGNALING DEVICE FOR VEHICLES.

1,226,102.     Specification of Letters Patent.     Patented May 15, 1917.

Application filed May 10, 1916. Serial No. 96,500.

*To all whom it may concern:*

Be it known that I, RANDALL F. MEDICUS, a citizen of the United States, residing at Youngstown, in the county of Mahoning and State of Ohio, have invented certain new and useful Improvements in Direction-Indicators and Signaling Devices for Vehicles, of which the following is a specification.

The present invention relates to direction indicators and signaling devices for automobiles and other vehicles and has for an object to provide a direction indicator and signaling apparatus for use on automobiles and the like for announcing to drivers following the machine on which this apparatus is installed, proposed changes in direction at cross streets and proposed stoppages with view of reducing the liability of rear end collisions, and assisting drivers to maintain proper distance between vehicles as now generally required by traffic ordinance.

Another object of the invention is to provide signaling leaves which may be operated at ease by the driver, whereby both leaves may be extended and also showing two flickering lights situated, one on each side, of a central tail light provided with an ordinary red lens, which also illuminates the license number, also providing an electric bell which operates upon the same circuit as the flickering lights and thereby provides a signal calling attention to the driver's intention of the changing of course or stopping in the daytime.

It is understood that the lights are to be used only at night, and suitable means has been provided for switching off the lights from the battery in the daytime.

A further purpose of the invention is to provide extending leaves and flickering lights indicating stoppage of vehicle if both are extended and lights shown and a flickering light operating in conjunction with either the right or left leaf which will indicate the intention of the driver to turn to the right or left, as an extended leaf and a flickering light will be shown at night indicating the direction the driver intends to take.

With these and other objects in view the invention consists in the novel details of construction and combinations of parts more fully hereinafter disclosed and particularly pointed out in the claims.

In the accompanying drawings:—

Figure 6:
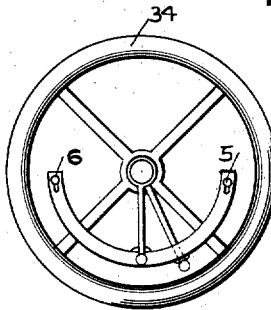
Fig. 6 is a detail view of the controlling switches mounted on the steering wheel.

Referring more particularly to the drawings, wherein one embodiment of my invention is illustrated, 1 designates a casing cover, housing the mechanism of the signaling apparatus, said cover provided with a central round opening 2, provided with a red lens. At the right and left of said casing covering 1, directly over the flickering lights 31, are vertical slots 3, formed with points 20 extending outwardly in the direction of position of leaves 4. Leaves 4 are normally concealed within the casing 17, but are arranged in registration with slots at each end of the casing 17, so that when either leaf is desired to be extended by operating the switch 5 or 6 as shown in Figs. 6 and 7 thereby connecting an electric circuit, the leaves may be controlled.

In operating this signaling device, the operator may extend the right leaf 4 by closing the switch 5, or he may extend the left leaf 4 by closing the switch 6. By closing either switch a circuit is connected which operates the solenoids 7, pulling the iron rod 8 downwardly into the core of the solenoid. At the upper end of rod 8, a pin 9 hinges the same to an extended arm 10 of a cog wheel 11 which is keyed to a shaft 12 journaled in the bottom of the casing 17. The cog wheel 11 engages with cog wheel 13 positioned upon shaft 14 fastened to the bottom of casing 17. By referring to Fig. 3 it will be seen that the leaves 4 are formed with arms 15. These leaves 4 are firmly fastened to the shaft 14, said shaft passing through the ends of the arms 15.

Figure 5:
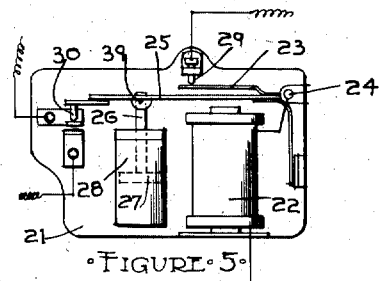
Fig. 5 is a detail view of flickering device.

It will readily be seen that the leaves 4 will fold back within the case 17 when the circuit is broken as the center of gravity of leaves 4 is positioned within the case 17. The coil spring 18, attached to cog wheel 11 and to the bottom of the casing 17, holds the leaves securely in folded position when not in use and when the electric circuit is not on. A lug 16 is at the extreme outward point of the leaf when extended. This lug 16 rests against a shoulder at the bottom of the slots at the ends of the casing 17. The electric bell 19 is also joined in the electric circuit and rings when the circuit is closed. The flickering device 21 is also put in operation by closing the switch 5 or 6. This flickering device 21 consists of an electric magnet 22, see Fig. 5, and an arm 23 pivoted upon a journal 24. There is a lower extension of this arm shown as 25 in Fig. 5. Near the outer end of this arm 25 there is pivotally attached a piston rod 26 by means of pin 39, this piston rod is attached to a piston 27, this piston 27 fitting loosely in a cylinder 28, this cylinder 28 is filled with oil. When the magnet 22 is charged it attracts and pulls down the arm 25, thereby breaking the circuit at contact point 29 and closing the circuit at point 30. The oil in the cylinder 28 causing the breaking of circuits at point 29 and 30 to be regular and slower in action than if not thus retarded. The flickering device 21 is attached to an electric circuit and causes the lights 31 to flicker, thereby attracting more attention to the lights 31 than if they were on constantly.

Figure 7:
Fig. 7 is a detail sectional view of a controlling switch.

It will readily be seen that by operating the buttons 5 or 6 the respective switch 32 is closed, see Fig. 7, causing the light 31 at the right or the light 31 at the left to flicker as desired by the operator, thereby indicating the direction the driver is about to turn. It will also be seen that by this device the driver at night will cause a bell 19 to be rung, and will cause a flickering of a light 31 to the right or to the left of a common tail light 33 centrally located at the under side of casing 17. A leaf will also be extended to the right or left thereby further indicating the direction the driver is about to turn. The tail light 33 is turned off or on by means of switch 41. See Fig. 3. It will be seen that the operating buttons 5 and 6 are conveniently located upon the steering wheel 34.

Figure 1:
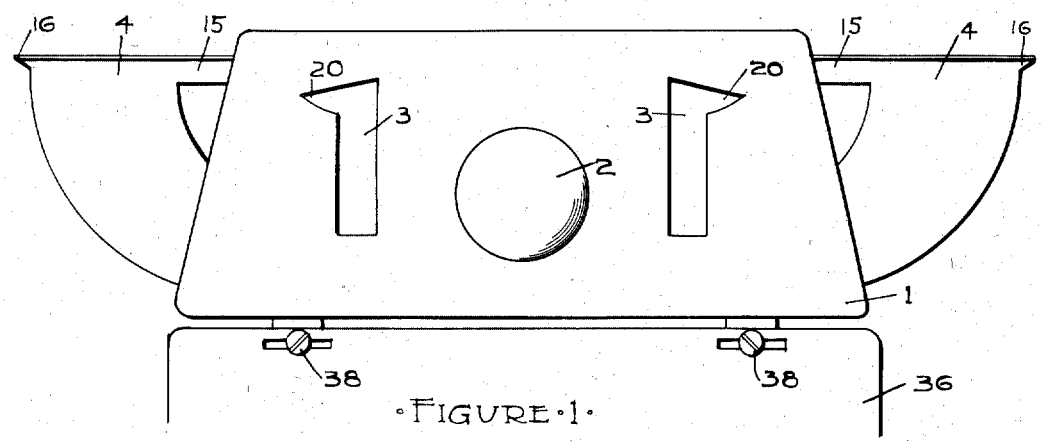
Figure 1 is a front elevation view of the signaling apparatus.
Figure 2:
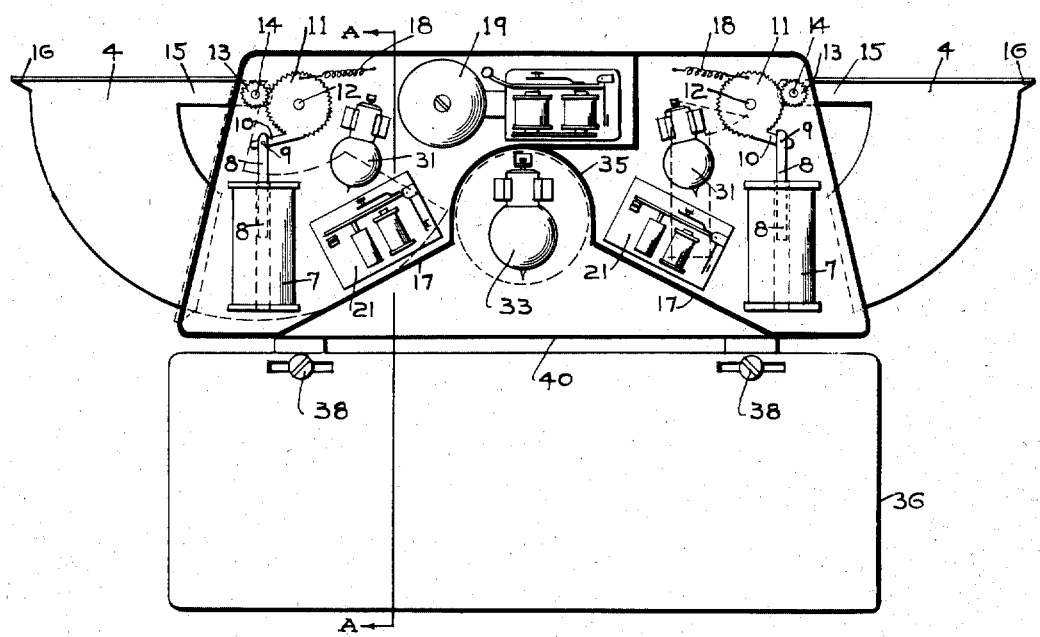
Fig. 2 is a vertical view of the same with the cover removed.
Figure 4:
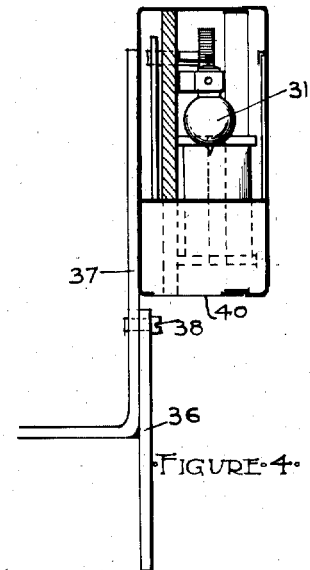
Fig. 4 is a vertical sectional view through the case as shown in Fig. 2, on line A—A.

The tail light 33 is installed upon a separate electric circuit and gives a constant light when turned on. In Fig. 2 the position of the tail light 33 is clearly shown under the arc 35 of the casing 17. This tail light 33 also illuminates the license number sign 36 by shining through slot 40 directly underneath the tail light 33. See Figs. 2 and 4.

The license number sign 36 is firmly attached by means of bolts 38 to the bracket 37 which is in turn attached to the vehicle.

Figure 3:
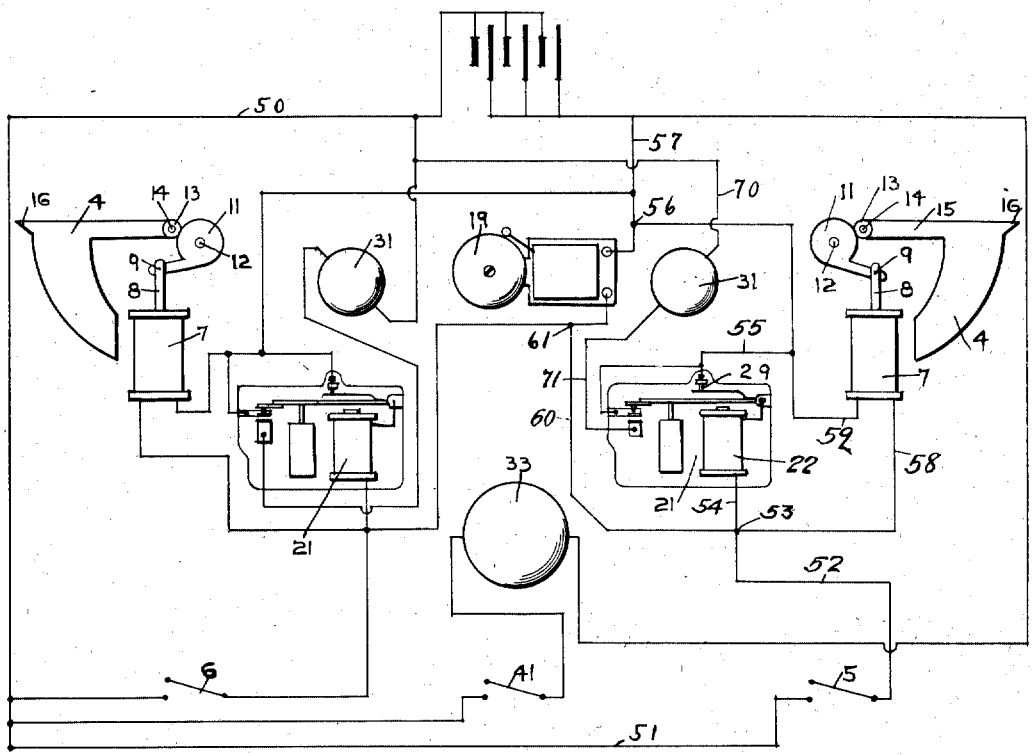
Fig. 3 is a diagram of the system of circuits employed to actuate the various devices of the apparatus.

Any suitable arrangement of electric circuits may be used for operating these signals, but as shown referring to Fig. 3, by closing switch 5, the connection of the following circuit is made from the battery via wires 50 and 51, switch 5 wire 52 to junction 53, wire 54 magnet 22 of the right flickering device point 29, wire 55, to junction 56, wire 57 back to the battery. Solenoid 7 of the right leaf is energized via wire 58 from junction 53 and wire 59 to junction 56. From junction 53 the circuit to bell 19 is traced via 60 to the common junction 61. When magnet 22 attracts its armature the circuit at 29 is broken, but the circuit for the lamp 31 closed at 30 via 70 and 71.

By closing switch 6, the left portion of the device is caused to act the same as described above when closing switch 5.

It will readily be seen that by closing both switches 5 and 6, both sides of the combined device are put in operation and indicate the intention of stopping by the driver.

What I claim is:—

1. In a direction indicator and signaling device for vehicles the combination of a casing adapted for attachment to the vehicle and constructed with a casing cover with a central round opening, vertical slots positioned to the right and left of said central opening, said slots formed with a point extending outwardly at its upper end, direction indicating leaves mounted within said casing, lights immediately underneath the openings of said casing, solenoids in conjunction with said leaves, flickering devices causing the lights underneath the vertical slots of said casing cover to flicker, controlling switches mounted upon the steering wheel energizing by means of an electric circuit said parts either singly or simultaneously.

2. In a direction indicator and signaling device for vehicles the combination of a casing adapted for attachment to the vehicle and constructed with a casing cover, having a central round opening, vertical slots positioned to the right and left of said central opening, said slots formed with a point extending outwardly at its upper end, direction signaling leaves mounted within said casing and controlled by solenoids within the casing, electric lights immediately underneath said vertical slots and central opening, flickering devices for the lights energized by common circuits, solenoids in conjunction with the signaling leaves and an electric bell, circuits to energize the above parts either singly or simultaneously, and a central tail light operating upon an independent circuit arranged to shed light upon a license number sign positioned directly underneath said tail light.

3. A direction indicator and signaling device for vehicles comprising a casing, a signaling leaf mounted within the casing at each end, a cover provided with a central round opening and two vertical slots located 5 at the right and at the left of said central opening, these slots formed with a point extending outwardly in the direction of the position of the signaling leaves, electric lights immediately underneath these vertical 10 slots, a central tail light located directly underneath the central round opening and directly under an arched portion of the casing side, the signaling leaves connected to solenoids, a solenoid in conjunction with 15 each leaf, said solenoid attached to a cog wheel with an extended arm mounted within the casing, engaging another cog wheel journaled within the casing and upon which is attached a signaling leaf, a coil spring 20 attached to the cog wheel with the extended arm and to the bottom of the casing, an electric bell secured within the casing, flickering devices located to the right and to the left of the central opening and securely fastened within the casing, said flickering device consisting of a magnet, a vibrating arm mounted between two contact points, a piston rod pivotally connected to said arm and operating a piston within a cylinder filled with oil, two electric circuits to energize the solenoids, either singly or simultaneously, also the lights located immediately underneath the vertical slots of the casing cover, the electric bell operating on either circuit or both, a license number sign attached immediately below a slot in the casing, the tail light operating upon an independent circuit and lighting said license number sign, and a common mounting for the casing and the license number sign.

In testimony whereof I have affixed my signature in the presence of two witnesses.

RANDALL F. MEDICUS.

Witnesses:
W. H. ROWLANDS,
H. P. McCOY.